US012337200B2

(12) United States Patent
Estkowski et al.

(10) Patent No.: US 12,337,200 B2
(45) Date of Patent: Jun. 24, 2025

(54) RESPIRATOR APPARATUS

(71) Applicants: Christopher Estkowski, Menlo Park, CA (US); Ken Kershner, Menlo Park, CA (US); Paul Newby, Menlo Park, CA (US); Chelsea Harrison Ramm, Loveland, CO (US)

(72) Inventors: Christopher Estkowski, Menlo Park, CA (US); Ken Kershner, Menlo Park, CA (US); Paul Newby, Menlo Park, CA (US); Chelsea Harrison Ramm, Loveland, CO (US)

( * ) Notice: Subject to any disclaimer, the term of this patent is extended or adjusted under 35 U.S.C. 154(b) by 0 days.

(21) Appl. No.: 18/520,316

(22) Filed: Nov. 27, 2023

(65) Prior Publication Data

US 2025/0170432 A1 May 29, 2025

Related U.S. Application Data

(60) Provisional application No. 63/428,314, filed on Nov. 28, 2022.

(51) Int. Cl.

| | |
|---|---|
| ***A62B 7/10*** | (2006.01) |
| ***A62B 9/02*** | (2006.01) |
| ***A62B 23/02*** | (2006.01) |

(52) U.S. Cl.

CPC .................. *A62B 7/10* (2013.01); *A62B 9/02* (2013.01); *A62B 23/02* (2013.01)

(58) Field of Classification Search

CPC .. A62B 7/10; A62B 9/02; A62B 18/02; A62B 18/025; A62B 18/04; A62B 18/045;

(Continued)

(56) References Cited

U.S. PATENT DOCUMENTS

2016/0067441 A1* 3/2016 Bearne .............. A61M 16/0683 128/205.25
2021/0274861 A1* 9/2021 Conrad ..................... B03C 3/32

(Continued)

FOREIGN PATENT DOCUMENTS

CA 3178380 11/2021
FR 3111565 A1 * 12/2021

OTHER PUBLICATIONS

English Machine Translation of FR 3111565 A1 provided by Espacenet (Year: 2021).*

(Continued)

*Primary Examiner* — Joseph D. Boecker
*Assistant Examiner* — Brian T Khong
(74) *Attorney, Agent, or Firm* — Run8 Patent Group, LLC; Peter Miller; Alexander Rodriguez

(57) ABSTRACT

One variation of a respirator apparatus includes a shield center section, a filter assembly, and a gasket. The shield center section defines: a transparent center region configured to align with a nose and a mouth of a user; and a filter window laterally offset from the transparent center region. The filter assembly includes a filter media and a seal: encircling a perimeter of the filter media; and defining a center groove configured to mate with a rim of the filter window to transiently retain the filter assembly within the filter window. The gasket is arranged on a rear face of the lens center section and configured to: seal against a face of the user; and locate the lens center section and the filter assembly offset from the face of the user to form an airflow channel to direct airflow across a glabrous cheek region of the user.

18 Claims, 8 Drawing Sheets

(58) Field of Classification Search
CPC ....... A62B 18/08; A62B 18/084; A62B 18/10; A62B 23/02
See application file for complete search history.

(56) References Cited

U.S. PATENT DOCUMENTS

| | | | | |
|---|---|---|---|---|
| 2021/0379424 | A1* | 12/2021 | Connor | A62B 18/003 |
| 2021/0392974 | A1* | 12/2021 | van der Hoeven | G16H 40/63 |
| 2022/0096874 | A1* | 3/2022 | Connor | A62B 18/025 |
| 2022/0176169 | A1 | 6/2022 | Brick et al. | |
| 2023/0074044 | A1 | 3/2023 | Grayson | |
| 2023/0181943 | A1* | 6/2023 | Lurie | B01D 46/0028 128/858 |

OTHER PUBLICATIONS

International Search Report and Written Opinion for International Patent Application No. PCT/US23/81193; mailed on Apr. 12, 2024; 10 pages.
Notification of the International Application Number and of the International Filing Date for International Patent Application No. PCT/US23/81193; mailed on Dec. 26, 2023; 1 page.

* cited by examiner

RESPIRATOR APPARATUS

CROSS-REFERENCE TO RELATED APPLICATIONS

This application claims the benefit of U.S. Provisional Application No. 63/428,314, filed on 28 Nov. 2022, which is hereby incorporated in its entirety by this reference.

TECHNICAL FIELD

This invention relates generally to the field of respirators and more specifically to a new and useful apparatus for a transparent shield respirator with conformal foam facial gasket incorporating interchangeable voice translucent, conformal frame pleated filters in the field of respirators.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Respirator Apparatus

Figure 1:
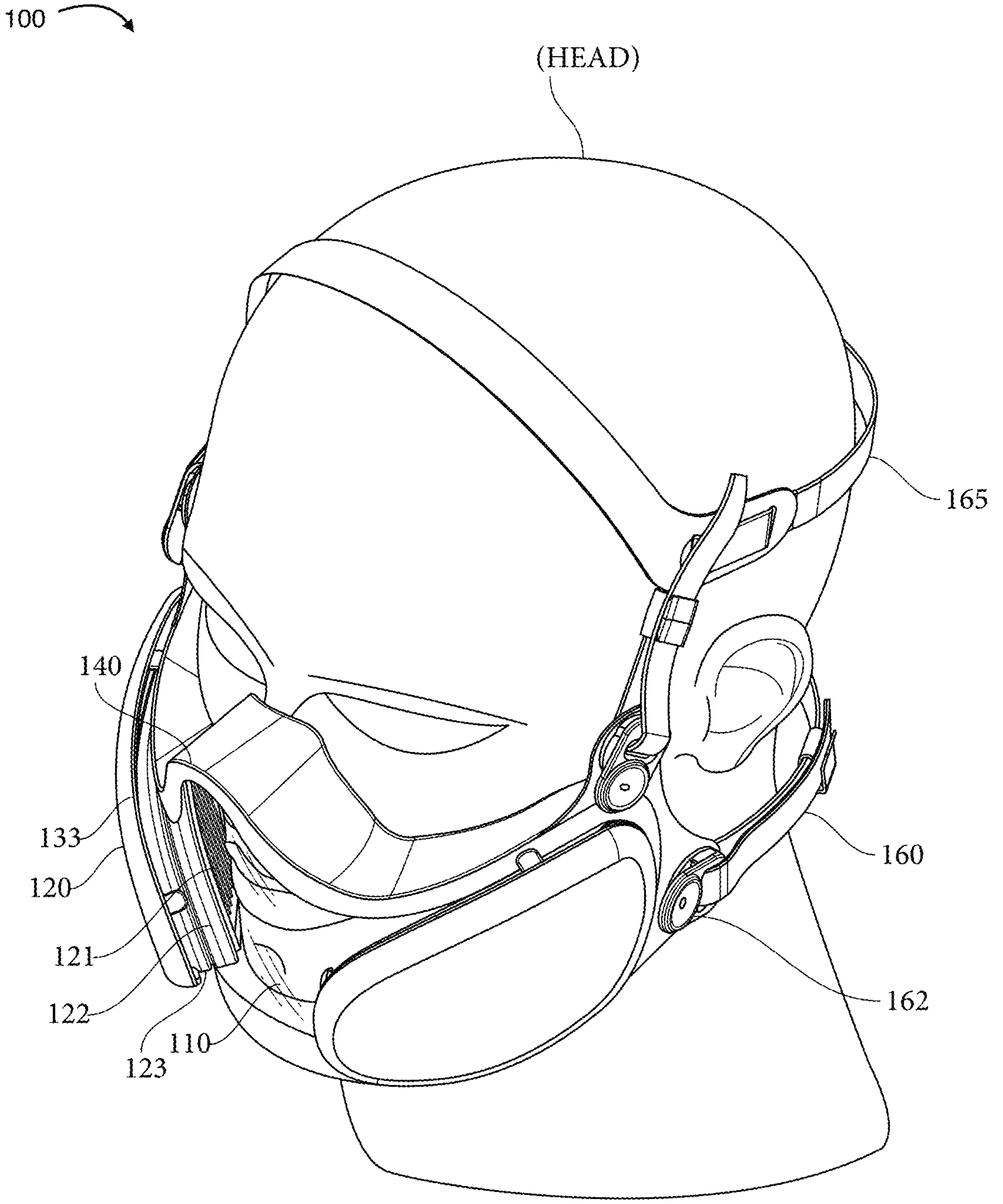
FIG. 1 is a schematic representation of a respirator apparatus.
Figure 2:
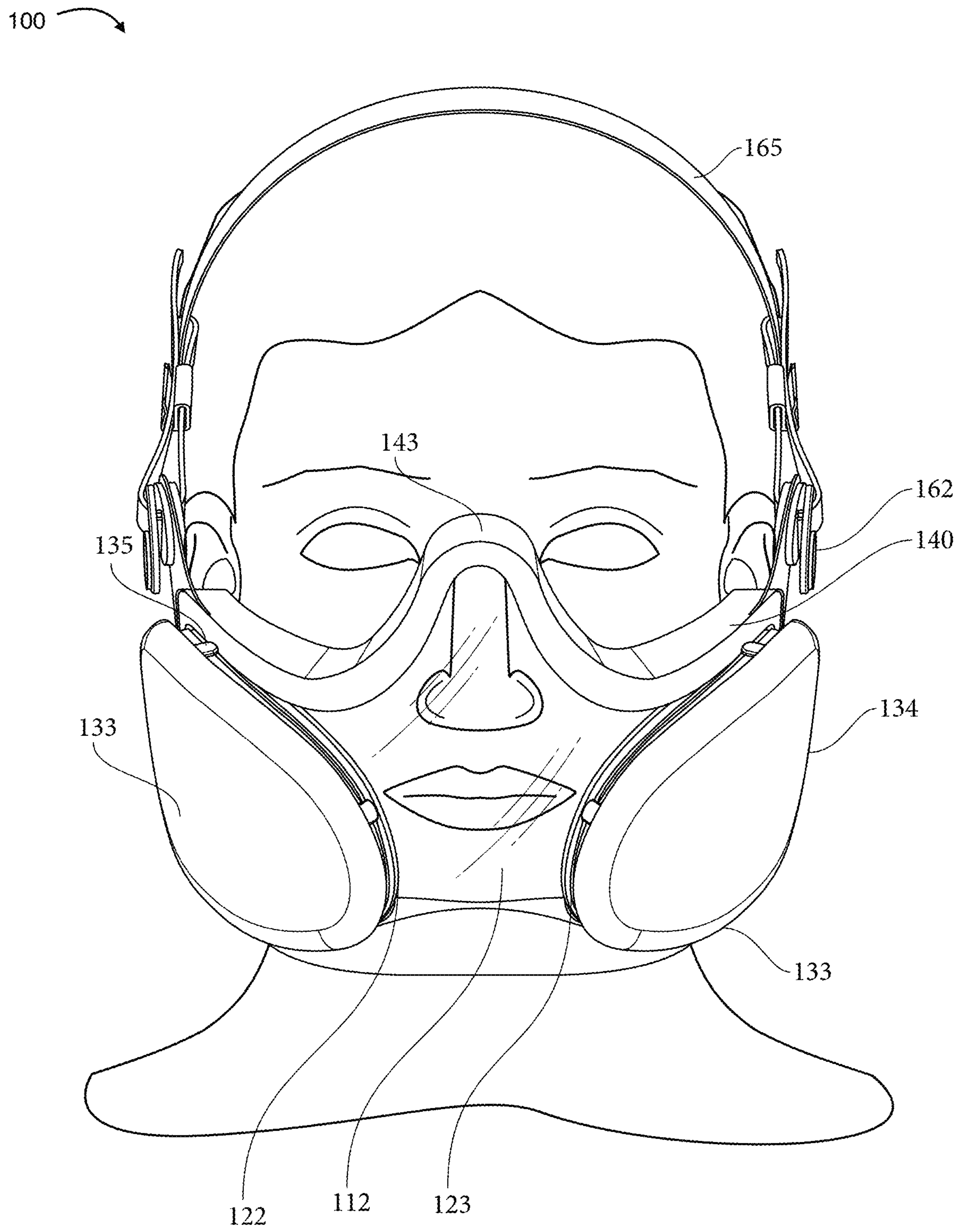
FIG. 2 is a schematic representation of a respirator apparatus.
Figure 3:
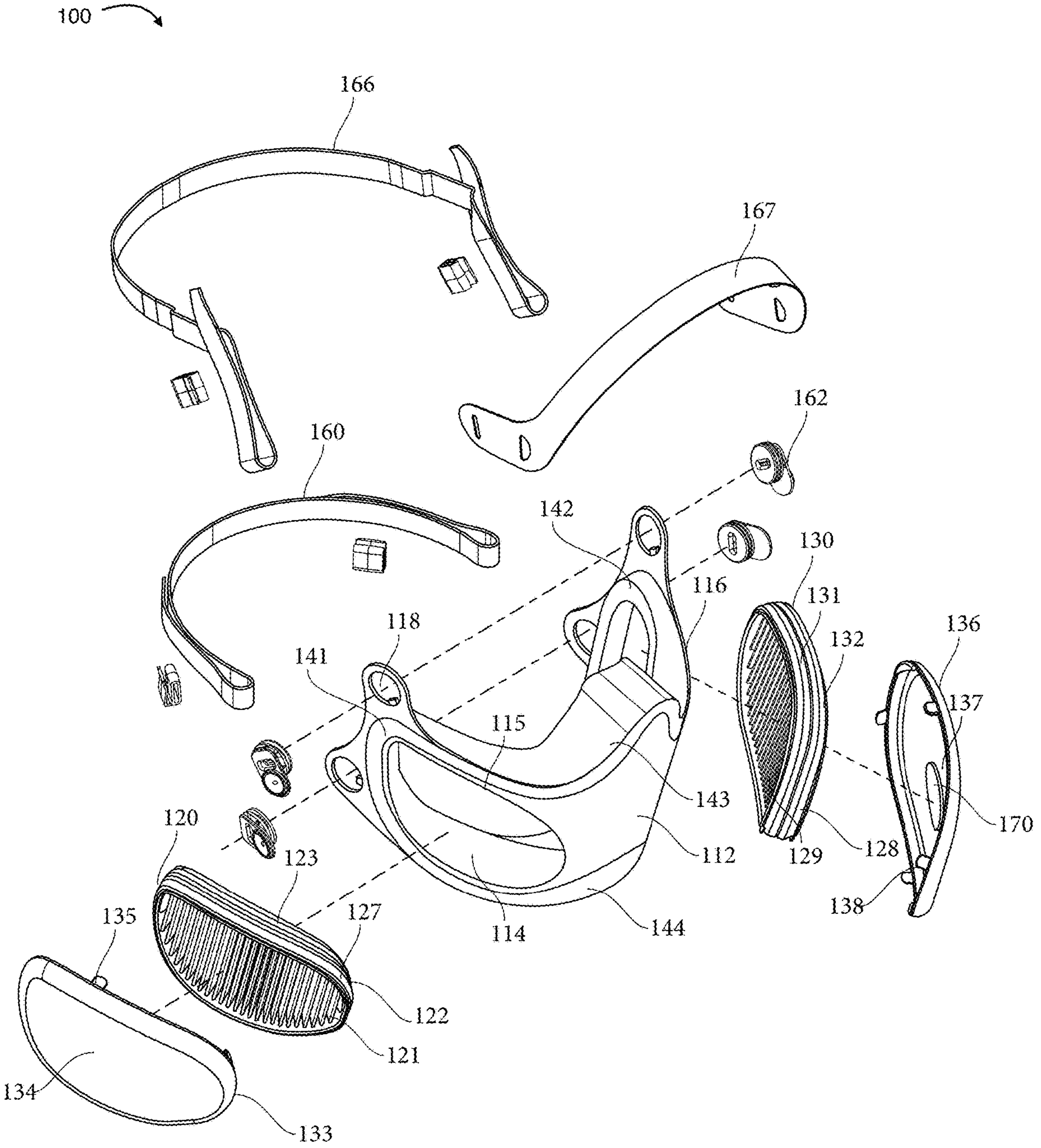
FIG. 3 is a schematic representation of a respirator apparatus.
Figure 4:
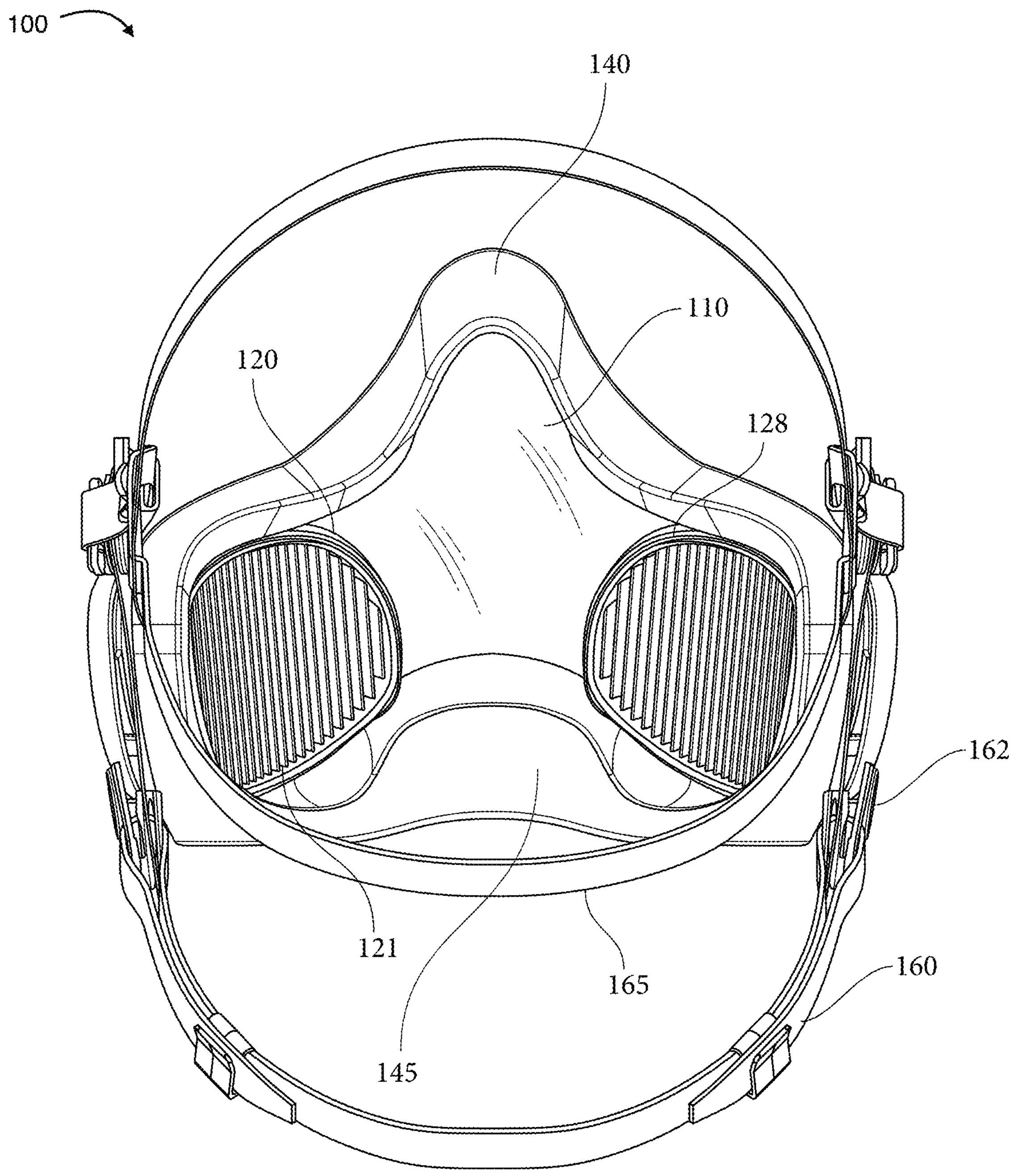
FIG. 4 is a schematic representation of a respirator apparatus.
Figure 5:
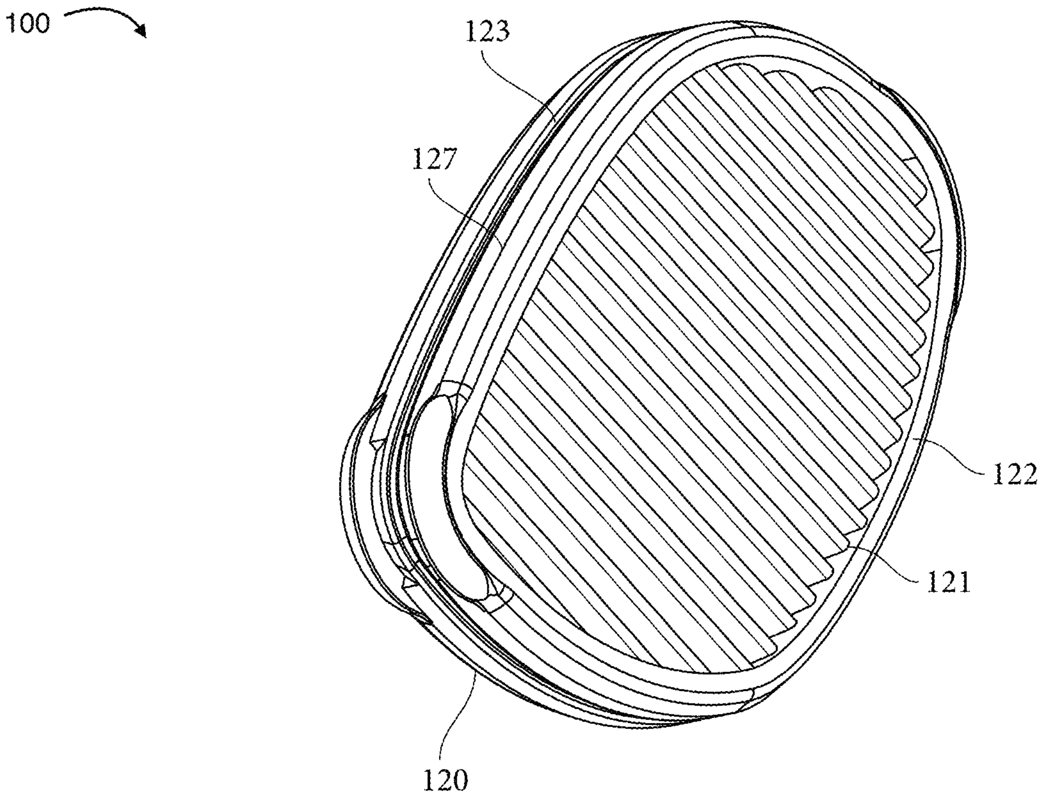
FIG. 5 is a schematic representation of a respirator apparatus.
Figure 6:
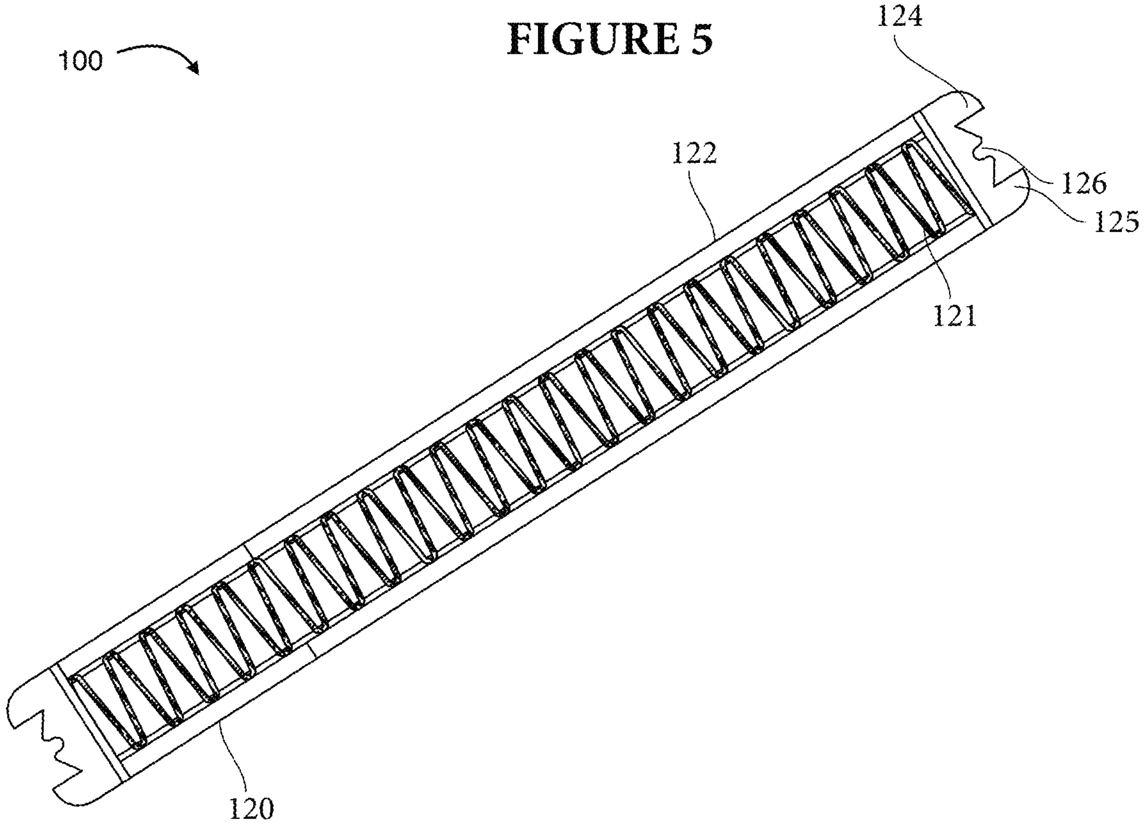
FIG. 6 is a schematic representation of a respirator apparatus.
Figure 7A:
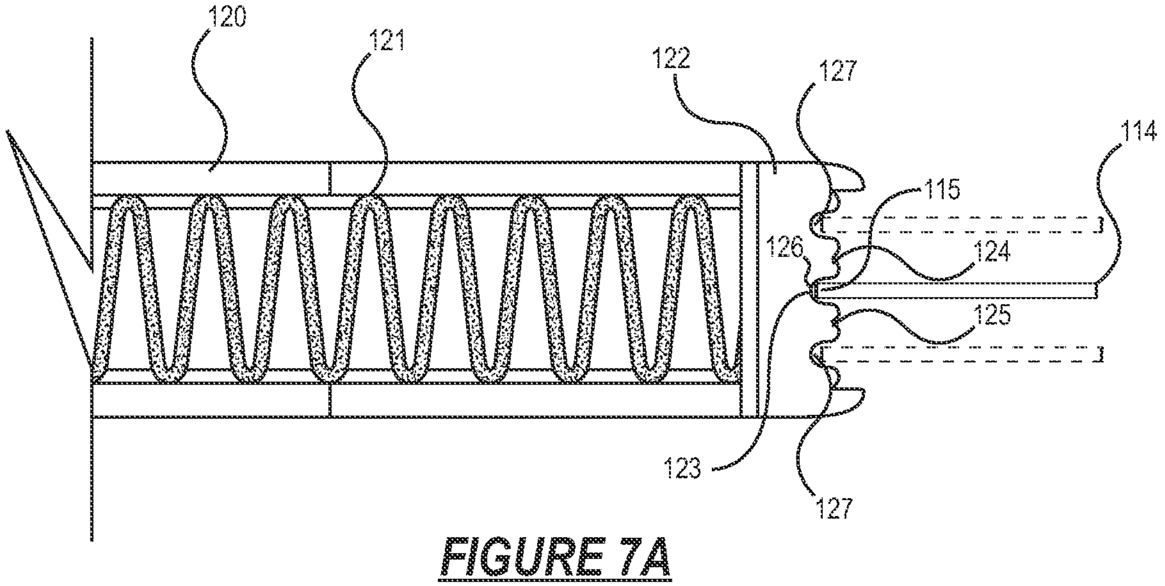
FIGS. 7A and 7B are a schematic representation of the respirator apparatus.
Figure 7B:
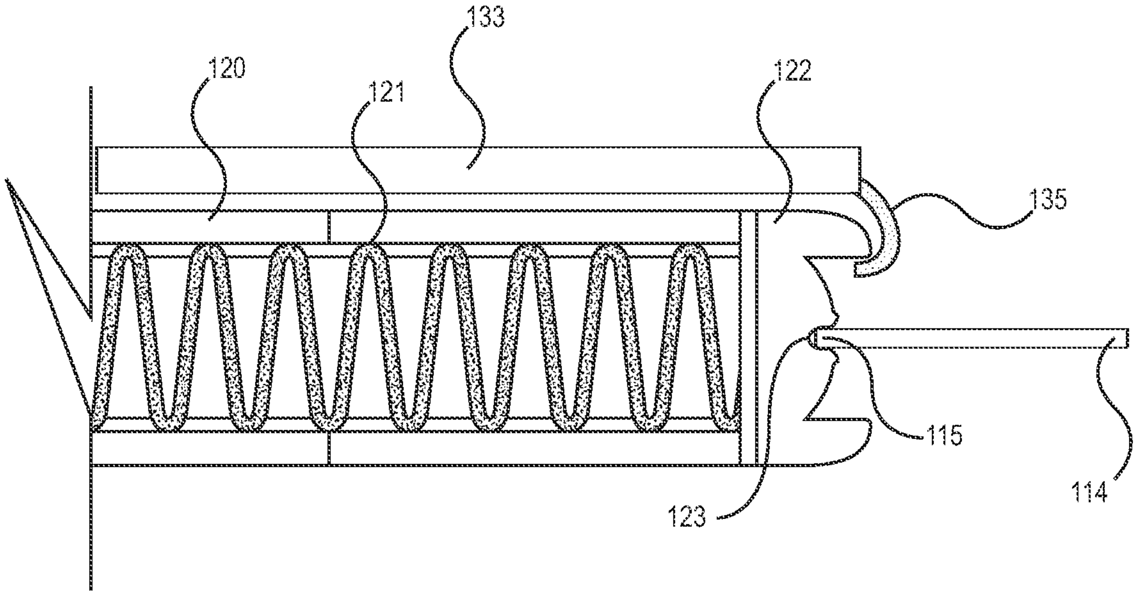
Figure 8:
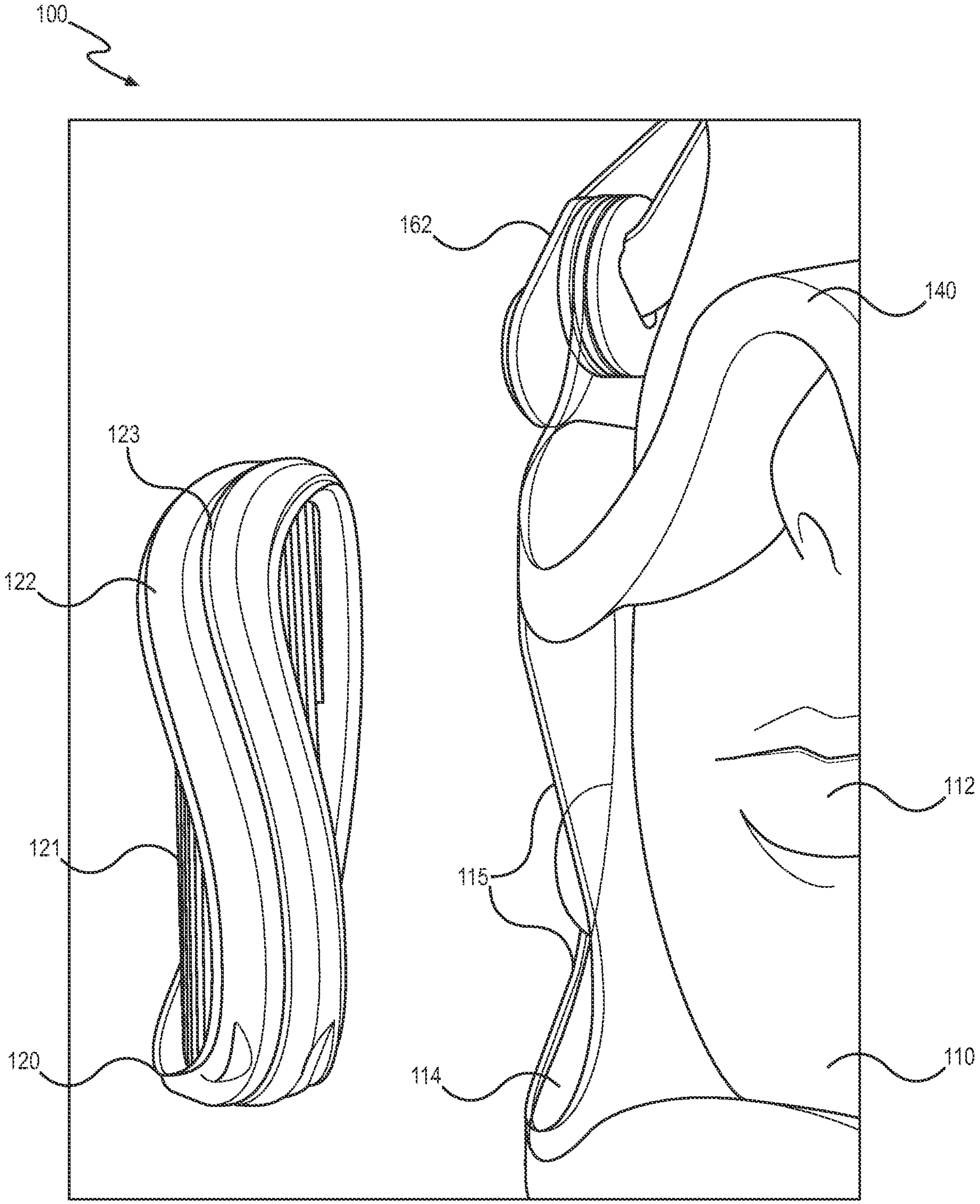
FIG. 8 is a schematic representation of a respirator apparatus.
Figure 9:
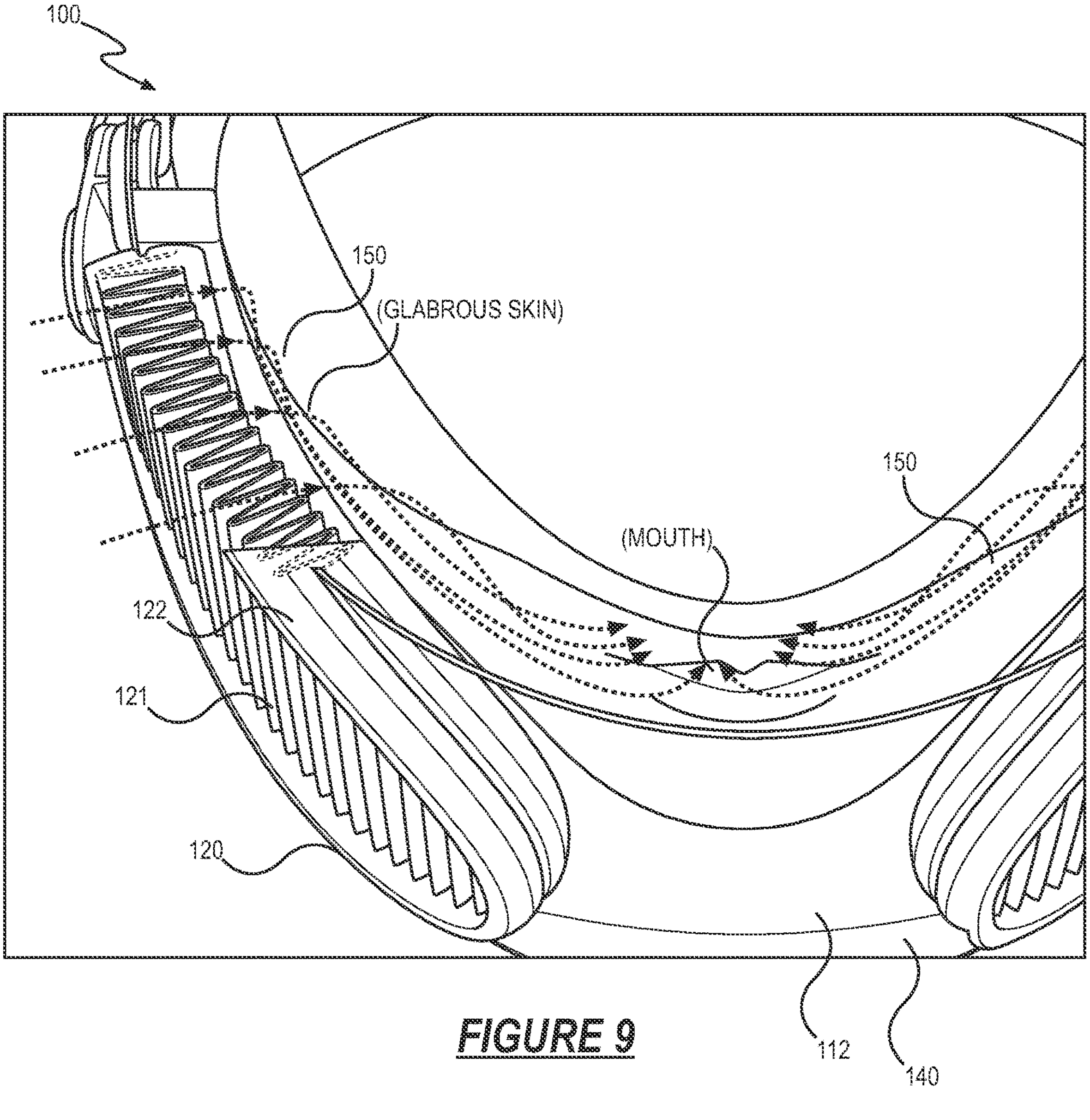
FIG. 9 is a schematic representation of a respirator apparatus.

As shown in FIG. 1, a respirator apparatus 100 includes: a shield center section 110; a first filter assembly 120; a second filter assembly 128; and a gasket 140.

The shield center section 110 is formed of a flexible material and is transparent in its entirety defining a center region 112 configured to locate centered over a face of a user; a left filter window 114 laterally offset from the transparent center region 112; and a right filter window 116 laterally offset from the transparent center region 112 opposite the left filter window 114.

The first filter assembly 120 includes a first filter media 121 and a first seal 122. The first seal 122: encircles a periphery of the first filter media 121; and defines a first center groove 123 configured to mate with a first rim 115 of the left filter window 114 to transiently retain the first filter assembly 120 within the left filter window 114.

The second filter assembly 128 includes a second filter media 129 and a second seal 130. The first seal 122: encircles a periphery of the second filter media; and defines a second center groove 131 configured to mate with a second rim of the right filter window 116 to transiently retain the second filter assembly 128 within the right filter window 116.

The gasket 140: is arranged on a rear face of the shield center section 110; and configured to conform with the contours of the face of the user and to center the transparent unobstructed window of the center region 112 with a nose and a mouth of the user. The gasket 140 is also configured to locate the shield center section 110 and the first filter assembly 120 offset from the face of the user to form a left airflow channel 150: defining a first height; defining a first depth less than the first height; and extending across a left cheek region of the user exposing glabrous skin regions on the upper cheek. The gasket 140 is also configured to locate the shield center section 110 and the second filter assembly 128 offset the face of the user to form a right airflow channel 150: defining a second height; defining a second depth less than the second height; and extending across a right cheek region of the user exposing glabrous skin regions on the upper cheek.

2. Applications

Generally, the respirator apparatus 100 can function as a respirator that: induces a cooling sensation across glabrous skin areas of the upper cheek region of the user; maintains contact with the face of the user by conforming responsively to movement of the face (e.g., head turning, speaking) by the user, demonstrating elasticity; and enables other users to view facial cues (e.g., expressions) from the user. More specifically, the respirator apparatus 100 can include: a shield center section 110 including a transparent region 112 configured to center over a nose and/or a mouth of the user; a filter assembly 120 transiently coupled to the shield center section 110 and arranged offset the transparent region 112 of the shield center section 110; and a gasket 140 arranged on a rear side of the shield center section 110 and configured to conformally mate with the face of the user to locate the filter assembly 120 proximal the glabrous cheek region of the user and form an airflow channel 150 within an interior volume of the shield center section 110 between the filter assembly 120 and the transparent center region 112 of the shield center section 110 identified as the plenum.

Thus, during inhalation (e.g., nasal inhalation, oral inhalation) and exhalation (e.g., nasal exhalation, oral exhalation) by the user, airflow within the airflow channel 150 is directed across the glabrous skin on the upper cheek region to induce the cooling sensation across the face of the user while maintaining an unobstructed view of the nose and the mouth of the user within the transparent center region 112 of the shield center section 110.

The respirator apparatus 100 includes the gasket 140: formed of an elastomeric conformal closed cell foam material including a non-porous skin surface; arranged about a periphery of the shield center section 110; including an upper gasket section 143 defining an arched geometry contoured along an upper edge of the transparent center region 112 of the shield center section 110; and including a lower gasket section 144 defining a concave geometry contoured along a lower edge of the transparent center region 112 of the shield center section 110. Additionally, the gasket 140 is configured to: conform against the face of the user to form a plenum airflow channel 150 extending between the filter assembly 120 and the transparent center region 112 within the interior of the shield center section 110; contour along a nasal bone of the user to maintain the upper gasket section 143 in contact with the face of the user; and contour along the mandible of the user to maintain the lower gasket section 144 in contact with the face of the user.

The respirator apparatus 100 can further include: a neck harness 160 coupled to the shield center section 110 and configured to wrap about a rear neck of the user; and a cranial harness 165 coupled to the shield center section 110 and configured to form a halo configuration about the cranium of the user. Accordingly, the neck harness 160 cooperates with the cranial harness 165 to: stabilize the gasket 140 about the face of the user to form the airflow channel 150 within the shield center section 110; locate the nose and the mouth of the user within the transparent center region 112 of the shield center section 110; and locate the filter window 114—and therefore the filter assembly 120—proximal the glabrous cheek region of the user.

Thus, the gasket 140 cooperates with the face of the user such that—rather than the gasket 140 sliding across the face of the user during movement of the face (e.g., head turns, mandible movement during speaking) by the user—the gasket 140 deflects, stretches, and compresses to conform to facial topology demonstrating homogenous elasticity, thereby: maintaining contact between the upper gasket section 143 and the nasal bone of the user; maintaining contact between the lower gasket section 144 and the bottom side of the mandible of the user; and directing airflow through the filter assembly within the interior volume of the shield center section 110.

Additionally, the shield center section 110 further includes a filter window 114: offset from the transparent center region 112 and configured to receive the filter assembly 120; and configured to receive the filter assembly 120 to locate the airflow channel 150 proximal the glabrous cheek region of the user. In particular, the filter assembly 120 can include: a filter media 121 (e.g., polytetrafluoroethylene membrane, spunbonded polyester); and a seal 122 encircling the filter media 121 and defining a center groove 123 extending about the periphery of the seal 122 and configured to mate with a rim 115 of the filter window 114 to locate the filter assembly 120 within the filter window 114. The seal 122 can: be formed of an elastomeric material configured to deform during installation of the filter assembly 120 into a filter window 114; and include a groove configured to expand around and to seal against inner and outer edges of a rim 115 of the filter window 114, thereby locating and sealing the filter assembly 120 within the filter window 114. Accordingly, the filter assembly 120: is operable in a deformed configuration by the user to locate the filter assembly 120 within the filter window 114 of the shield center section 110; and is operable in a nominal configuration to locate the rim 115 of the filter window 114 within the center groove 123 of the seal 122 and thus form an interference fit between the filter window 114 and the filter assembly 120 that directs airflow from an exterior side of the shield center section 110 through the filter assembly 120 within the interior volume of the shield center section 110. Thus, during inhalation by the user (e.g., from the nose, mouth), airflow within the airflow channel 150 is directed from the filter assembly 120 across the glabrous cheek region of the user to induce the cooling sensation. Additionally, during exhalation by the user (e.g., from the nose, mouth), airflow within the airflow channel 150 is directed from the transparent center region 112 across the glabrous cheek region of the user to induce the cooling sensation.

Therefore, the respirator apparatus 100: induces a cooling effect across the glabrous cheek region of the user during inhalation and exhalation of the user; enables an outside observer to view facial cues from the nose and the mouth region of the user located within the transparent center region 112 of the shield center section 110; deflects and twists about the face of the user to maintain the gasket 140 against the face of the user to direct airflow from the filter assembly 120 toward the interior volume of the shield center section 110; and prevents contaminants (e.g., airborne particulates, dirt, dust) about an exterior environment of the shield center section 110 from entering the interior of the shield center section 110 identified as the plenum.

3. Lens Section

Generally, the respirator apparatus 100 includes a shield center section 110: formed of an transparent flexible material (e.g., polycarbonate film) configured to deflect and twist responsive to movement of the face by the user; and configured to contour a face of the user to expose a nose and a mouth region of the user. More specifically, the respirator apparatus 100 includes: a transparent center region 112 configured to locate over a face (e.g., nose, mouth) of the user; a left filter window 114 laterally offset from the transparent center region 112; and a right filter window 116 laterally offset from the transparent center region 112 opposite the left filter window 114. Thus, the respirator apparatus 100: exposes the nose region and the mouth region to an observer when arranged on the face of the user; and supports transient coupling of a filter assembly 120 at the left filter window 114 and/or the right filter window 116 to prevent contaminants (e.g., airborne particulates, dirt, dust) about an exterior environment of the lens center section 110 from entering the interior of the shield center section 110.

In one implementation, the shield center section 110: defines a target width configured to curve from the left zygomatic bone to the right zygomatic bone of the user to locate the shield center section 110 to across a breathing zone (e.g., mouth, nose) and glabrous cheek regions of the user; and defines a target height configured to extend from a bridge of the nose to below a chin of the user. The shield center section 110 includes: an upper edge defining an upper arch configured to contour along a nose bone of the user; a lower edge defining a lower arch configured to contour along a mandible of the user; a left edge interposed between the upper edge and the lower edge and configured to contour along a left zygomatic bone of the user; and a right edge, opposite the left edge, interposed between the upper edge and the lower edge and configured to contour along a right zygomatic bone of the user. More specifically, the upper edge can further define: a left scalloped region configured to contour along a left maxilla bone, below a left eye, of the user to form an unobstructed field of view from the left eye when locating the lens center section 110 on the face of the user; and a right scalloped region—opposite the left scalloped region—configured to contour along a right maxilla bone, below the right eye, of the user to form an unobstructed field of view from the right eye when locating the shield center section 110 on the face of the user.

In this implementation, the shield center section 110 includes the left filter window 114: arranged proximal the left side of the lens center section 110; defining a target shape (e.g., semi-elliptical shape, circular shape, lozenge shape); defining a window width; and defining a window height less than the window width. Similarly, the shield center section 110 includes the right filter window 116: arranged proximal the right side of the shield center section 110; defining the target shape (e.g., semi-elliptical shape, circular shape, lozenge shape); defining the window width; and defining the window height less than the window width. Furthermore, the filter window 114 can include indicia (e.g., contrasting color band) arranged about the periphery of the filter window 114 representing a sealing edge configured to guide a user to locate the filter assembly 120 within the filter window 114 of the shield center section 110.

Although this implementation includes a left filter window 114 and a right filter window 116 arranged on the shield center section 110, other variations can include a single filter window and/or multiple (e.g., greater than two) filter windows arranged on the shield center section 110 configured to receive the filter assembly 120.

Therefore, the shield center section 110: enables observers to view facial cues (e.g., facial expressions) from the user through the transparent center region 112; includes the filter assembly 120 transiently coupled within the right filter window 116 and the left filter window 114 of the shield center section 110; and flexes and twists, responsive to movement of the face by the user.

4. Filter Assembly

Generally, the filter assembly 120 includes: a filter media 121; and a seal 122. The filter media 121: is configured to prevent contaminants (e.g., airborne particulates, dirt, dust) from passing from an exterior environment outside of the lens center section 110 into the interior volume of the respirator apparatus 100 between the shield center section 110 and the user's face. The seal 122: is arranged about (e.g., overmolded) the filter media 121; and defines an outer circumferential groove configured to seat around and compress against the rim 115 of a filter window 114 to thus form a double-seal against the inner and outer edges of the rim 115 of the filter window 114 while locating the filter media 121 within the filter window 114. More specifically, the filter assembly 120 is configured to deform-responsive to an applied force about the seal 122 encircling the filter media 121—to locate the filter assembly 120 entirely within the filter window 114. Accordingly, upon release of the applied force about the seal 122, the filter assembly 120 returns to a nominal shape (e.g., semi-elliptical shape) to induce mating between the center groove 123 arranged about the seal 122 and the rim 115 about the filter window 114, thereby forming the interference fit between the filter window 114 and the filter assembly 120. Thus, the filter assembly 120 can: block contaminants (e.g., airborne particulates, dirt, dust) from entering an interior of the shield center section 110; and form an interference fit between the filter assembly 120 and the filter window 114 to direct airflow from outside the shield center section 110 through the filter assembly 120 into the interior volume of the shield center section 110.

4.1 Interference Fit

In one implementation, the respirator apparatus 100 includes: the filter window 114 (e.g., left filter window 114 and/or left filter window 114) defining a square rim 115 about a periphery of the filter window 114; and the center groove 123 defining a forked geometry extending about a periphery of the seal 122 encircling the filter media 121 and configured to mate with the square rim 115 of the filter window 114.

In one example, the forked geometry includes: a first tine 124 encircling the periphery of the seal 122; a second tine 125—opposite the first tine 124—encircling the periphery of the seal 122; and a slot 126 interposed between the first tine 124 and the second tine 125 configured to receive the square rim 115 of the filter window 114. Accordingly, the forked geometry of the center groove 123 extends about the periphery of the seal 122 to mate with interior and exterior edges of the rim (e.g., four-sided rim, triangular rim, circular rim) about the periphery of the filter window 114 to form the interference fit between the filter assembly 120 and the shield center section 110. In this example, the center groove 123 can transiently couple the filter window 114 to: locate the square rim 115 of the filter window 114 within the slot 126 of the forked geometry of the center groove 123; seal the first tine 124 of the forked geometry against exterior edges of the rim 115 of the filter window 114; and seal the second tine 125 of the forked geometry against interior edges, opposite the exterior edges, of the rim 115 of the filter window 114, thereby forming the interference fit between the filter assembly 120 and the filter window 114.

In one implementation, the filter assembly 120 is operable: during application of a force about the periphery of the filter assembly 120, in a deformed configuration to locate the filter assembly 120 within the filter window 114; and, during absence of an applied force about the periphery of the filter assembly 120, in a nominal configuration to seal the filter assembly 120 against the rim of the filter window 114.

In one example, the filter media 121: includes a multilayer construction (e.g., single-layer or two-layer polytetrafluoroethylene membrane, where the polytetrafluoroethylene membrane layer is bonded on each side to spunbonded polyester scrim) of a target filtering efficiency (e.g., between 95% for R95, N95 filtering efficiency and 99.97% for P100, N100 filtering efficiency); defines a parallel pleated geometry enclosed within the seal 122 about the filter media 121; and spans a target surface area (e.g., between 80 square inches and 110 square inches, between 51000 square millimeters and 70967.6 square millimeters) within the seal 122. Additionally, the seal 122: is formed of an elastomeric material (e.g., urethane, thermoplastic) overmolded about the filter media 121; and defines a target durometer range (e.g., between 55 Shore A and 75 Shore A) configured to deform the filter assembly 120 responsive to an applied force about the seal 122 encircling the filter media 121.

In another example, the filter window 114 defines: a window width (e.g., between 3 inches and 4 inches); and a window height (e.g., between 0.5 and 1.0 inches) less than the window width. In this example, the filter assembly 120: defines a semi-elliptical geometry matching the window width and the window height; and is configured to laterally and vertically deform responsive to an applied force about the periphery of the filter assembly 120. Accordingly, the user can then: apply a force about the seal 122 encircling the filter media 121 to operate the filter assembly 120 in a deformed configuration to locate the filter assembly 120 within the window width and the window height of the filter window 114; and remove the applied force about the seal 122 to operate the filter assembly 120 in the nominal configuration to mate the center groove 123 with the rim of the filter window 114, thereby forming the interference fit between the filter assembly 120 and the filter window 114.

In one implementation, the filter assembly 120 can be interchanged across multiple filter windows located across the shield center section 110. For example, the shield center section 110 can include: a left filter window 114 arranged proximal the left side of the shield center section 110; and a right filter window 116 arranged proximal the right side of the shield center section 110. Accordingly, the filter assembly 120 is selectively arranged within the left filter window 114 or the right filter window 116 by the user. More specifically, the filter assembly 120: is operable in a first configuration including the center groove 123 of the seal 122 mating a first rim 115 of the left filter window 114 to transiently retain the filter assembly 120 within the left filter window 114; and is operable in a second configuration including the center groove 123 of the seal 122 mating a second rim of the right filter window 116, opposite the left filter window 114, to transiently retain the filter assembly 120 within the right filter window 116.

In another implementation, the respirator apparatus 100 includes a first filter assembly 120 including: a first filter media 121; and a first seal 122 encircling the first filter media 121 and defining a first center groove 123 configured to transiently couple the left filter window 114 of the shield center section 110. Similarly, the respirator apparatus 100 can include a second filter assembly 128 including: a second filter media 129; and a second seal 130 encircling the second filter media 129 and defining a second center groove 131 configured to transiently couple the right filter window 116 of the shield center section 110. In this implementation, as described above, the first filter assembly 120 and the second filter assembly 128 are interchangeable across the left filter window 114 and the right filter window 116. Additionally, although this implementation includes a first filter assembly 120 and a second filter assembly 128 configured to transiently couple the shield center section 110, other variations can include a single filter assembly and/or multiple (e.g., greater than two) filter assemblies configured to transiently couple filter windows arranged across the shield center section 110.

Therefore, the filter assembly 120 transiently couples the filter window 114 of the shield center section 110 in order to: during inhalation by the user, prevent contaminants (e.g., airborne particulates, dirt, dust) from entering an interior volume of the shield center section 110; and form an interference fit between the filter assembly 120 and the filter window 114 to direct airflow from outside the shield center section 110 through the filter assembly 120 toward the interior volume of the shield center section 110.

4.2 Filter Covers

In one implementation, the filter assembly 120 includes a seal 122: encircling the periphery of the filter media 121; defining a center groove 123 extending about the periphery of the seal 122; and defining an intermittent outer groove 127—adjacent the center groove 123—encircling the periphery of the seal 122 and configured to transiently couple a filter cover 133 extending across the filter media 121 of the filter assembly 120. In this implementation, the filter cover 133 includes: a pre-filter media 134 (e.g., siliconized, Sil-Scrim) heat molded polyester scrim, carbon scrim); and a capture detent 135 arranged about an internal periphery of the pre-filter media 134 and configured to couple the outer intermittent groove 127 to transiently retain the filter cover 133 across an outer face of the filter media 121. Accordingly, during retention of the filter cover 133 across the outer face, the filter cover 133 cooperates with the filter assembly 120 to form a plenum between the surface area of the filter media 121 of the filter assembly 120 and the pre-filter media 134 of the filter cover 133.

Additionally, the filter cover 133 can include a valve plate 170 configured to mate to the filter rim geometry: centrally located on the pre-filter media 134; arranged within the plenum formed by the filter assembly 120 and the filter cover 133; and configured to avoid inward airflow during inhalation by the user and outward airflow during exhalation by the user. Thus, the filter cover 133 cooperates with the filter assembly 120 to isolate the filter media 121 of the filter assembly 120 from an external environment in order to phase airflow (e.g., inward airflow, outward airflow) and prevent large particulates and liquid contaminants (e.g., >PM10 airborne particulates, dirt, dust, body fluids, blood, water droplets) from directly contacting the filter media 121 of the filter assembly 120.

Additionally, the valve plate 170, centrally located on the pre-filter media 134 suspended proximal to the inlet opening of the filter assembly 120 separated from the filter assembly 120 inlet face by the plenum as to prevent interference with inward airflow during inhalation or outward airflow during exhalation. The valve plate 170 is configured to cover the inlet face of the filter assembly 120. The configuration of the pre-filter media 134 incorporates flexibility of the outer plane of the pre-filter media 134 that suspends the valve plate 170 proximal to the face of the filter assembly 120. Upon demand the valve plate 170 can be deflected by force to engage the face of the filter assembly 120 and obstruct inlet and outlet airflow to allow an evaluation of the gasket 140 seal mating integrity to the face of the user. The force to engage the valve plate 170 to the face of the filter assembly 120 is less than 1 inch-pound so as not to induce a false positive gasket seal mating integrity evaluation by adding pressure to the gasket 140 seal during the applied pressure sequence of the evaluation process. The evaluation requires short and abrupt inhalation bursts sufficient to generate a vacuum in the plenum of the respirator while the valve plates 170 are simultaneously deflected and pressed against the faces of the filter assemblies 120. The resulting increase in vacuum caused by an abrupt inhalation draws the respirator apparatus 100 toward the face increasing pressure from the gasket 140 onto the facial sealing land readily perceived by the user. Weak or lack of vacuum during the evaluation indicates gasket seal leakage at the gasket-face sealing land and requires refitting the respirator apparatus 100 until a perceptible vacuum can be performed.

In one example, the respirator apparatus 100 includes a first filter assembly 120 including a first seal 122 defining: a first center groove 123 extending about the periphery of the first seal 122; and a first intermittent outer groove 127—adjacent the first center groove 123—encircling the periphery of the first seal 122. In this example, the first filter assembly 120 can transiently couple the left filter window 114 to locate the first outer groove 127 at an exterior side of the lens center section 110. Additionally, the respirator apparatus 100 includes a first filter cover 133 including: a first pre-filter media 134; and a first capture detent 135 arranged about a periphery of the first pre-filter media 134 and configured to couple the first intermittent outer groove 127 to transiently retain the first filter cover 133 across a first outer face of the first filter media 121 of the first filter assembly 120. Similarly, the respirator apparatus 100 includes a second filter assembly 128 including a second seal 130 defining: a second center groove 131 extending about the periphery of the first seal 122; and a second intermittent outer groove 132—adjacent the second center groove 131—encircling the periphery of the second seal 130. The second filter assembly 128 can transiently couple the right filter window 116 to locate the second outer groove 132 at the exterior side of the lens center section 110. Furthermore, the respirator apparatus 100 includes a second filter cover 136 including: a second pre-filter media 137; and a second capture detent 138 arranged about a periphery of the second pre-filter media 137 and configured to couple the second intermittent outer groove 132 to transiently retain the second filter cover 136 across a second outer face of the second filter media 129 of the second filter assembly 128.

Therefore, the respirator apparatus 100 can include a filter cover 133 configured to transiently couple the filter assembly 120 in order to: prevent large particulate and liquid contaminants (e.g., >PM10 airborne particulates, dirt, dust, body fluids, blood, water droplets) from directly contacting the filter media 121 of the filter assembly 120; and direct airflow (e.g., inward airflow, outward airflow) during inhalation and exhalation by the user.

4.3 Adjustable Filter Depth

In one implementation, the filter assembly 120: is operable in a first depth configuration including the center groove 123 of the seal 122 coupling the filter window 114 to locate the filter assembly 120 at a first depth (e.g., between 0.1 and 0.2 inches) within the interior volume of the lens center section 110; and is operable in a second depth configuration including the outer groove 127 of the seal 122 coupling the filter window 114 to locate the filter assembly 120 at a second depth, greater than the first depth (e.g., between 0.21 and 0.3 inches), within the interior volume of the lens center section 110. More specifically, the filter assembly 120: is operable in the first depth configuration including the center groove 123 of the seal 122 mating with the rim of the filter window 114 to transiently retain the filter assembly 120 within the filter window 114 at the first depth; and is operable in the second depth configuration including the outer groove 127 of the seal 122 mating with the rim of the filter window 114 to transiently retain the filter assembly 120 within the filter window 114 at the second depth greater than the first depth.

Therefore, the filter assembly 120 is selectively arranged within the filter window 114 to adjust depth of the filter assembly 120 extending within the interior volume of the lens center section 110 in order to prevent direct contact of the filter assembly 120 with the face of the user when larger filters are installed. Although, this implementation includes the seal 122 defining a center groove 123 and an outer groove 127 about the periphery of the seal 122, other variations can include a single groove and/or multiple (e.g., greater than two) grooves arranged about the periphery of the seal 122 encircling the filter media 121 of the filter assembly 120.

5. Gasket

Generally, the respirator apparatus 100 includes a gasket 140: arranged about a rear side of the lens center section 110; and configured to conform against the face of the user. More specifically, the gasket 140: is arranged (e.g., adhesively coupled, overmolded) about a periphery of the lens center section 110; is configured to contour about the face of the user to locate the nose and mouth of the user within the transparent center region 112 of the shield center section 110; and forms an airflow channel 150 within the interior volume of the shield center section 110 to direct airflow-during inhalation and exhalation by the user-across a glabrous cheek region of the user. Thus, the gasket 140: during movement of the face by the user, maintains contact against the face of the user to prevent air from entering and/or exiting the interior volume (e.g., plenum) of the lens center section 110 along the gasket 140 compressed against the face of the user; and induces a passive cooling effect-during inhalation and exhalation by the user-across the face of the user as air passing through the airflow channel 150 flows across the glabrous cheek region of the user.

5.1 Facial Compression

In one implementation, the gasket 140: is formed of an elastomeric closed cell conformal foam material including a non-porous surface (e.g., integrated skin); is arranged about the rear side of the shield center section 110; and is configured to conform against the face of the user to locate the filter window 114 proximal the glabrous cheek region of the user. In particular, the gasket 140: is formed of a elastomeric urethane foam and/or a elastomeric silicone foam material; includes a continuous smooth skin surface integrally formed during the specialized foam molding process that implements a proprietary tool coating that breaks surface tension between the tool contact surfaces and the foam, on contact, collapsing the air cells near the surface of the foam, forming a uniformly smooth skin surface that has increased durability, improved release characteristics and an ideal sealing land surface finish against facial contours; and defines a continuous boundary about the rear side of the lens center section 110 to contour the nose, cheeks, and chin of the user to maintain contact against the face of the user during movement of the face (e.g., movement of the mandible) by the user.

In this implementation, the gasket 140 includes a left gasket section 141: defining a first depth (e.g., 0.25 inches, 6 millimeters) contoured along a left edge of the lens center section 110; and configured to conform a left side of a mandible of the user to locate the left filter window 114 of the lens center section 110 proximal a left glabrous cheek region of the user. Similarly, the gasket 140 includes a right gasket section 142: matching the first depth (e.g., 0.20 inches, 5 millimeters) contoured along a right edge of the lens center section 110; and configured to conform against the right side of the mandible of the user to locate the right filter window 116 of the lens center section 110 proximal a right glabrous cheek region of the user. The entire gasket 140 is a single continuous injection molded part designed to eliminate all mold parting lines that create potential leak paths between the sealing land of the gasket and facial topology.

Accordingly, the right gasket section 142 cooperates with the left gasket section 141 to: maintain contact between the gasket 140 and the face of the user (e.g. Sealing Land); and direct airflow through the filter assembly 120 into the interior volume of the lens center section 110 (e.g. Plenum). Thus, during movement of the face by the user (e.g., movement of the mandible, turning of the head), the gasket 140—by the design of the gasket's elastomeric, foam conforming characteristics and geometry sculpted specifically to move with the gasket sealing land's interface on facial topology-maintains contact with the face of the user.

Additionally, the gasket 140 includes an upper gasket section 143: defining a second depth greater than the first depth (e.g., 0.25 inches, 6 millimeters); defining an arched geometry contoured along an upper edge of the transparent center region 112; and configured to conform against the skin supported by a nasal bone and a zygomatic bone of the user to locate the nose of the user within the transparent center region 112 of the shield center section 110. Furthermore, the gasket 140 includes a lower gasket section 144: defining third depth greater than the second depth (e.g., 0.80 inches, 20 millimeters); defining a concave geometry contoured along a lower edge of the transparent center region 112; and configured to conform against a bottom side of the mandible of the user to locate a chin and the mouth of the user within the transparent center region 112 of the lens center section 110.

Accordingly, the lower gasket section 144 cooperates with the upper gasket section 143, the left gasket section 141, and the right gasket section 142 in order to maintain contact against the skin supported by facial bones (e.g., nasal bone, zygomatic bone, mandible) of the user while maintaining glabrous cheek regions exposed within an interior volume of the shield center section 110. Therefore, rather than the gasket 140 sliding across the face of the user during movement of the face (e.g., head turns, mandible movement during speaking) by the user, the gasket 140 can elastically deflect, thereby: maintaining contact between the upper gasket section 143 and the nasal bone of the user; and maintaining contact between the lower gasket section 144 and the bottom side of the mandible of the user.

5.2 Airflow Channel+Facial Cooling

In one implementation, the gasket 140 is configured to conform against the face of the user to: locate the filter assembly 120 offset a glabrous cheek region of the user; and form an airflow channel 150 extending from the filter assembly 120 to the transparent center region 112, locating the nose and the mouth of the user, and configured to direct airflow across the glabrous cheek region of the user. In particular, the airflow channel 150: defines a target depth range (e.g., between 0.1 inches and 0.3 inches, between 2.5 millimeters and 8 millimeters) between an interior surface of the shield center section 110 and the face of the user; and defines a target height range (e.g., between 0.5 inches and 1.5 inches, between 2.5 millimeters and 8 millimeters) across the glabrous cheek region of the user.

In one example, the gasket 140 is configured to conform against the face of the user to: locate the first filter assembly 120 offset a left glabrous cheek region of the user; and form a left airflow channel 150 extending from a first filter assembly 120 at the left filter window 114 to the transparent center region 112 of the shield center section 110 and configured to direct airflow—flowing within the left airflow channel 150—across the left glabrous cheek region of the user. Similarly, the gasket 140 is configured to compress against the face of the user to: locate the second filter assembly 128 offset a right glabrous cheek region of the user; and form a right airflow channel 150 extending from the second filter assembly 128 at the right filter window 116 to the transparent center region 112 of the shield center section 110 and configured to direct airflow—flowing within the right airflow channel 150—across the right glabrous cheek region of the user. Accordingly, air travels within the left airflow channel 150 across the left glabrous cheek region of the user and the right airflow channel 150 across the right glabrous cheek region of the user, thereby inducing a cooling effect for the user during inhalation and exhalation by the user.

For example, during inhalation by the user, the first filter assembly 120 cooperates with the second filter assembly 128 to: direct airflow within the left airflow channel 150—flowing from the first filter assembly 120 to the mouth of the user-laterally and vertically across the left glabrous cheek region; and direct airflow within the right airflow channel 150—flowing from the second filter assembly 128 to the mouth of the user-laterally and vertically across the right glabrous cheek region. Additionally, during exhalation by the user, the first filter assembly 120 cooperates with the second filter assembly 128 to: direct airflow within the left airflow channel 150—flowing from the mouth of the user to the first filter assembly 120—laterally and vertically across the right glabrous cheek region; and direct airflow within the right airflow channel 150—flowing from the mouth of the user to the second filter assembly 128—laterally and vertically across the right glabrous cheek region.

In another example, during inhalation by the user, the first filter assembly 120 cooperates with the second filter assembly 128 to: direct airflow within the left airflow channel 150—flowing from the first filter assembly 120 to the nose of the user-laterally and vertically across the left glabrous cheek region; and direct airflow within the right airflow channel 150—flowing from the second filter assembly 128 to the nose of the user—laterally and vertically across the right glabrous cheek region. Additionally, during exhalation by the user, the first filter assembly 120 cooperates with the second filter assembly 128 to: direct airflow within the left airflow channel 150—flowing from the nose of the user to the first filter assembly 120—laterally and vertically across the right glabrous cheek region; and direct airflow within the right airflow channel 150—flowing from the nose of the user to the second filter assembly 128—laterally and vertically across the right glabrous cheek region.

Therefore, the gasket 140 is configured to conform against the face of the user to form the airflow channel 150 within the interior volume of the shield center section 110 in order to induce a cooling effect across the glabrous cheek region of the user during inhalation (e.g., nasal inhalation, oral inhalation) and exhalation (e.g., nasal exhalation, oral exhalation) by the user.

5.3 Moisture Control

In one implementation, the shield 110: is formed of a transparent flexible material (e.g., polycarbonate film); and includes a hydrophilic coating arranged across an interior side and an exterior side of the lens center section 110. Inhalation and exhalation by the user results in formation of moisture (e.g., fog, droplets) across the interior surface of the lens center section 110 which in turn obstructs facial cues (e.g., expressions) made by the user. Accordingly, the hydrophilic coating across the lens center section 110: prevents formation of moisture (e.g., fog, droplets) across the interior surface of the interior section; and directs moisture—by way of gravity—to lower gasket section 144 of the gasket 140 arranged about the shield center section 110.

In another implementation, the gasket 140 can include a moisture trap 145 (e.g. cavity depression) molded into the lower section and cooperating with the hydrophilic coating and moisture shedding gasket skin surface to capture moisture formed within the interior side of the lens center section 110. Thus, the gasket 140 enables the user to routinely (i.e., as needed) dispose of moisture collected within the moisture trap 145 molded into the lower gasket section 144 of the gasket 140 by the user manually breaking the gasket seal under and adjacent the trap area during any exhalation phase of the breathing cycle so as not to contaminate the plenum space with particulate. Other variations of this implementation can include a one-way release valve inlet at the base of the moisture trap 145 arranged at the lower gasket section 144 and configured to selectively release moisture accumulated within the moisture trap 145 at the lower gasket section 144 by the user performing a user seal check forcing the moisture trap valve to open providing a path for moisture collected in the trap to escape the respirator so as not to contaminate the plenum space with particulate.

6. Headband

Generally, the respirator apparatus 100 can include: a neck harness 160 coupled to the shield center section 110 and configured to wrap around a neck of the user; and a cranial harness 165 coupled to the shield center section 110 and configured to wrap about an upper cranium of the user. In particular, the cranial harness 165 cooperates with the neck harness 160 to: locate the shield center section 110 proximal the face of the user; and maintain conformance of the gasket 140 against the face of the user. Thus, during movement of the face by the user, the neck harness 160 cooperates with the cranial harness 165 to, rather than slide across the face of the user, maintain conformance of the gasket 140 against the face of the user.

In one implementation, the shield center section 110 includes: a lower left perforation 118 arranged proximal the left filter window 114 of the shield center section 110; and a lower right perforation 118 arranged proximal the right filter window 116 of the shield center section 110 opposite the lower left perforation 118. Additionally, the neck harness 160 includes: a first harness clip 162 (e.g., snugger clip) arranged at a first end of the neck harness 160 and transiently coupled to the lower left perforation 118 of the lens center section 110; and a second harness clip 162 (e.g., snugger clip) arranged at a second end, opposite the first end, of the neck harness 160 and transiently coupled to the lower right perforation 118 of the lens center section 110.

In one example, the neck harness 160: is formed of an elastomeric material (e.g., laminated foam backed microfiber, woven polyester flat webbing); and spans a target length (e.g., 26 inches, 66.04 centimeters) from the first end to the second end of the neck harness 160; and spans a target height (e.g., 0.5 inches, 12 millimeters) configured to contour along a rear neck of the user.

Additionally, the shield center section 110 includes: an upper left perforation 118 arranged proximal the left filter window 114 of the shield center section 110; and an upper right perforation 118 arranged proximal the right filter window 116 of the shield center section 110 opposite the upper left perforation 118. Furthermore, the cranial harness 165 includes: a rear cranial section 166—formed of the elastomeric material as described above configured to wrap about a rear cranium of the user; a third harness clip 162 (e.g., snugger clip) arranged at a first end of the rear cranial section 166 and transiently coupled to the upper left perforation 118 of the shield center section 110; and a fourth harness clip 162 (e.g., snugger clip) arranged at a second end, opposite the first end, of the rear cranial section 166 and transiently coupled to the upper right perforation 118 of the shield center section 110. The cranial harness 165 also includes a front cranial section 167 (e.g., thermoplastic strip): coupled the rear elastomeric cranial section 166; and including an extended dogleg section oriented rearward on either side to wrap about a front cranium of the user; and cooperating with the rear cranial section to form a halo encircling an upper cranium of the user. This cranial harness provides the additional utility of setting the adjustment of the yoke for one hand respirator donning to the face of the user.

Accordingly, the cranial harness 165 cooperates with the neck harness 160 to locate the cranial harness 165 taut about the upper cranium of the user providing pressure to stabilize the gasket 140 against the face of the user. Therefore, during movement of the face by the user, the neck harness 160 cooperates with the neck harness 160 to maintain conformally the gasket 140 against the face of the user.

7. Respirator Setup+Facial Configuration

In one implementation, the respirator apparatus 100 includes the shield center section 110 including: the gasket 140 arranged about the rear side of the shield center section 110; the transparent center region 112 configured to locate over the face of the user; the left filter window 114 laterally offset from the transparent center region 112; and the right filter window 116 laterally offset from the transparent center region 112 opposite the left filter window 114. During initial setup of the respirator apparatus 100, the user can: couple a first filter assembly 120 within the left filter window 114 of the shield center section 110; couple the second filter assembly 128 within the right filter window 116 of the shield center section 110; couple the neck harness 160 to the shield center section 110; and couple the cranial harness 165 to the shield center section 110.

The neck harness 160 is configured to support the respirator apparatus 100 about the rear neck of the user and maintain the respirator apparatus 100 in a suspended configuration about the user's neck prior to placing the gasket 140 about the face of the user. The user can then: conform the gasket about the face of the user to induce direction of airflow through the filter assembly 120 into the interior volume of the shield center section 110; and secure the cranial harness 165 in a halo configuration about the upper cranium of the user. Accordingly, the cranial harness 165 cooperates with the neck harness 160 to maintain conformally the gasket 140 against the face of the user creating a sealed plenum between the shield and the face of the user.

In the sealed configuration, the gasket 140 maintains conformally against the face of the user to form the left airflow channel 150 across the left glabrous cheek region of the user and the right airflow channel 150 across the right glabrous cheek region of the user. Accordingly, in the sealed configuration, the first filter assembly 120 is located offset the left glabrous cheek region of the user and the second filter assembly 128 is located offset the right glabrous cheek region of the user. Thus, during inhalation (e.g., nasal inhalation, oral inhalation) and exhalation (e.g., nasal exhalation, oral exhalation) the respirator apparatus 100 induces a cooling effect across the left glabrous cheek region and the right glabrous cheek region of the user.

Additionally, the gasket 140 cooperates with the face of the user such that-during movement of the face by the user-rather than slide across the face of the user, the gasket 140 elastically deforms while maintaining contact with the face of the user while directing airflow within the left airflow channel 150 and the right airflow channel 150.

Therefore, the respirator apparatus 100: induces a cooling effect across the glabrous cheek region of the user during inhalation and exhalation of the user; enables an outside observer to view facial cues from the nose and the mouth region of the user located within the transparent center region 112 of the shield center section 110; and prevents contaminants (e.g., airborne particulates, dirt, dust) about an exterior environment of the lens center section 110 from entering the interior of the lens (e.g., plenum) center section 110.

As a person skilled in the art will recognize from the previous detailed description and from the figures and claims, modifications and changes can be made to the embodiments of the invention without departing from the scope of this invention as defined in the following claims.

We claim:

1. A respirator apparatus comprising:
- a shield center section:
  - formed of a flexible material; and
  - defining:
    - a transparent center region configured to locate over a face of a user;
    - a left filter window laterally offset from the transparent center region; and
    - a right filter window laterally offset from the transparent center region opposite the left filter window;
- a first filter assembly:
  - comprising:
    - a first filter media; and
    - a first seal:
      - encircling a periphery of the first filter media;
      - defining a first center groove; and
      - defining a first outer groove, offset from the first center groove, encircling the periphery of the first filter media;

operable in a first configuration, the first center groove of the first seal mating with a first rim of the left filter window to transiently retain the first filter assembly within the left filter window in the first configuration; and operable in a second configuration, the first outer groove of the first seal mating with the first rim of the left filter window to transiently retain the first filter assembly within the left filter window in the second configuration;

a second filter assembly comprising:

a second filter media; and a second seal:

encircling a periphery of the second filter media; and defining a second center groove configured to mate with a second rim of the right filter window to transiently retain the second filter assembly within the right filter window; and a gasket:

arranged on a rear face of the shield center section; and configured to:

conform against the face of the user to align the transparent center region with a nose and a mouth of the user;

locate the shield center section and the first filter assembly offset from the face of the user to form a left airflow channel;

and locate the shield center section and the second filter assembly offset from the face of the user to form a right airflow channel.

2. The respirator apparatus of claim 1, wherein the first filter assembly and the second filter assembly cooperate with each other and are configured to:

during inhalation by the user:

direct airflow within the left airflow channel, flowing from the first filter assembly to the nose of the user, laterally and vertically across a left glabrous region of an upper cheek of the user; and direct airflow within the right airflow channel, flowing from the second filter assembly to the nose of the user, laterally and vertically across a right glabrous region of the upper cheek of the user; and during exhalation by the user:

direct the airflow within the left airflow channel, flowing from the nose of the user to the first filter assembly, laterally and vertically across a right glabrous region of the upper cheek of the user; and direct the airflow within the right airflow channel, flowing from the nose of the user to the second filter assembly, laterally and vertically across the right glabrous region of the upper cheek of the user.

3. The respirator apparatus of claim 1:

wherein the first center groove:

defines a forked geometry inset about a periphery of the first seal and comprising:

a first tine;

a second tine opposite the first tine; and a slot interposed between the first tine and the second tine; and is configured to transiently couple the left filter window to:

locate a first rim of the left filter window within the slot of the forked geometry;

seal the first tine of the forked geometry against exterior edges of the first rim of the left filter window; and seal the second tine of the forked geometry against interior edges, opposite the exterior edges, of the first rim of the left filter window, the second tine cooperating with the first tine to form an interference fit between the exterior edges and the interior edges of the first rim of the first filter assembly.

4. The respirator apparatus of claim 1:

further comprising a first filter cover comprising:

a first pre-filter media; and a first capture detent arranged about the first pre-filter media and configured to couple the first outer groove to transiently retain the first filter cover across a first outer face of the first filter media;

wherein the second seal further comprises a second outer groove, offset from the second center groove, encircling the periphery of the second filter media; and further comprising a second filter cover comprising:

a second pre-filter media; and a second capture detent arranged about the second pre-filter media and configured to couple the second outer groove to transiently retain the second pre-filter across a second outer face of the second filter media.

5. The respirator apparatus of claim 1:

wherein the first filter media:

is formed of a three-layer construction comprising:

a first layer comprising a polytetrafluoroethylene membrane;

a second layer of polyester scrim laminated to a first side of the first layer; and a third layer of polyester scrim laminated to a second side, opposite the first side, of the first layer;

defines a parallel pleated geometry enclosed within the first seal; and spans a target surface area range between 80 square inches and 110 square inches; and wherein the first seal:

is formed of an elastomeric material overmolded about the first filter media; and exhibits a durometer between 55 Shore A and 75 Shore A.

6. The respirator apparatus of claim 1:

wherein the first filter window defines:

a first window width; and a first window height less than the first window width; and wherein the first filter assembly:

defines a semi-elliptical geometry:

of the first window width; and of the first window height;

is configured to laterally and vertically deform responsive to an applied force about the periphery of the first filter assembly;

is operable, during application of a force about the periphery of the first filter assembly, in a deformed configuration to locate the first filter assembly within the first window width and the first window height of the first filter window; and is operable, during absence of the applied force about the periphery of the first filter assembly, in a nominal configuration to seal the first filter assembly against the first rim of the first filter window.

7. The respirator apparatus of claim 1, wherein the first filter assembly:

is operable in a third configuration comprising the first center groove of the first seal mating the first rim of the left filter window to transiently retain the first filter assembly within the left filter window; and is operable in a fourth configuration comprising the first center groove of the first seal mating the second rim of the right filter window to transiently retain the first filter assembly within the right filter window.

8. The respirator apparatus of claim 1:
wherein the shield center section further comprises:
an upper left perforation proximal the left filter window;
a lower left perforation, arranged below the upper left perforation, proximal the left filter window;
an upper right perforation proximal the right filter window; and
a lower right perforation, arranged below the upper right perforation, proximal the right filter window; and
further comprising:
a neck harness:
comprising:
a first clip arranged at a first end of the neck harness and transiently coupled to the lower left perforation of the shield center section; and
a second clip arranged at a second end, opposite the first end, of the neck harness and transiently coupled to the lower right perforation of the shield center section; and
configured to wrap about a rear neck of the user; and
a cranial harness:
comprising:
a rear cranial section configured to wrap about a rear cranium of the user;
a front cranial section coupled to the rear cranial section and configured to wrap about a front cranium of the user;
a third clip arranged at a first end of the rear cranial section and transiently coupled to the upper left perforation of the shield center section; and
a fourth clip arranged at a second end, opposite the first end, of the rear cranial section, and transiently coupled to the upper right perforation of the shield center section; and
configured to cooperate with the neck harness to locate the gasket conformally to the face of the user.

9. The respirator apparatus of claim 1, wherein the gasket:
is formed of an elastomeric conformal foam material comprising a non-porous surface;
is configured to conformally mate to the face of the user, incorporating a narrow sealing land to expose glabrous skin regions of the user and direct airflow from outside the shield center section through the first filter assembly and the second filter assembly across the glabrous skin regions into an interior volume of a shield center section plenum; and
comprises:
a left gasket section:
contoured along a left edge of the shield center section; and
configured to conform with a left side of a mandible of the user to locate the left filter window of the shield center section proximal a left glabrous cheek region of the user; and
a right gasket section:
contoured along a right edge of the shield center section;
configured to conform with a right side of the mandible of the user to locate the right filter window of the shield center section proximal a right glabrous cheek region of the user; and
cooperating with the left gasket section to, during movement of the mandible by the user, maintain contact between the gasket and the face of the user.

10. The respirator apparatus of claim 9, wherein the gasket further comprises:
an upper gasket section:
defining an arched geometry contoured along an upper edge of the transparent center region; and
configured to conform against the skin supported by a nasal bone and a zygomatic bone of the user to locate the nose of the user within the transparent center region of the shield center section; and
a lower gasket section:
defining a concave geometry contoured along a lower edge of the transparent center region;
configured to conform with a bottom side of the mandible of the user to locate a chin and the mouth of the user within the transparent center region of the shield center section; and
cooperating with the upper gasket section to elastically deflect, during movement of the mandible by the user, to:
maintain contact between the upper gasket section and the skin on the nasal bone of the user; and
maintain contact between the lower gasket section and the skin on the bottom side of the mandible of the user.

11. The respirator apparatus of claim 1:
wherein the shield center section:
is formed of a polycarbonate film material; and
comprises a hydrophilic coating arranged across an interior side and an exterior side of the shield center section; and
wherein the gasket comprises a lower section:
configured to conform with a lower mandible of the user; and
comprising a moisture trap molded into the lower section and cooperating with the hydrophilic coating to capture moisture formed within the interior side of the shield center section.

12. A respirator apparatus comprising:
a lens center section defining:
a transparent center region configured to locate over a face of a user; and
a first filter window laterally offset from the transparent center region;
a filter assembly comprising:
a filter media; and
a seal:
encircling a periphery of the filter media;
defining a center groove of a forked geometry comprising:
a first tine;
a second tine opposite the first tine; and
a slot interposed between the first tine and the second tine; and
configured to mate with the first filter window to:
locate a first rim of the first filter window within the slot to transiently retain the filter assembly within the first filter window;
seal the first tine against exterior edges of the first rim of the first filter window; and seal the second tine against interior edges, opposite the exterior edges, of the first rim of the first filter window; and a gasket:

arranged on a rear face of the lens center section; and configured to:

seal against the face of the user to align the transparent center region with a nose and a mouth of the user; and locate the lens center section and the filter assembly offset from the face of the user to form an airflow channel.

13. The respirator apparatus of claim 12, wherein the filter assembly is configured to:

during inhalation by the user:

direct airflow within the airflow channel, flowing from the first filter assembly to the mouth of the user, laterally and vertically across a glabrous cheek region; and during exhalation by the user:

direct the airflow within the airflow channel, flowing from the mouth of the user to the first filter assembly, laterally and vertically across the glabrous cheek region.

14. The respirator apparatus of claim 12:

wherein the seal further comprises an intermittent outer groove, offset from the center groove, encircling the periphery of the filter media; and further comprising a filter cover comprising:

a pre-filter media;

a first capture detent arranged about the pre-filter media and configured to couple the intermittent outer groove of the seal to transiently retain the filter cover across an outer face of the filter media; and a valve plate suspended from the pre-filter media and configured to displace against the first rim of the filter assembly and seal off a plenum space responsive to a deflecting force on an exterior of the filter media.

15. The respirator apparatus of claim 12:

wherein the seal further comprises an outer groove, offset from the center groove, encircling the periphery of the filter media; and wherein the filter assembly:

is operable in a first configuration comprising the center groove of the seal mating the first rim of the first filter window to:

transiently retain the filter assembly within the first filter window; and is operable in a second configuration comprising the outer groove of the seal mating the first rim of the first filter window to:

transiently retain the filter assembly within the first filter window.

16. The respirator apparatus of claim 12:

wherein the lens center section further defines a second filter window laterally offset from the transparent center region opposite the first filter window; and wherein the filter assembly:

is operable in a first configuration comprising:

the first rim of the first filter window nested within the slot of the seal to transiently retain the filter assembly within the first filter window;

the first tine sealed against exterior edges of the first rim of the first filter window; and the second tine sealed against interior edges, opposite the exterior edges, of the first filter window; and is operable in a second configuration comprising:

a second rim of the second filter window nested within the slot of the seal to transiently retain the filter assembly within the first filter window;

the first tine sealed against exterior edges of the second rim of the second filter window; and the second tine sealed against interior edges, opposite the exterior edges, of the second rim of the second filter window.

17. A respirator apparatus comprising:

a lens center section defining:

a transparent center region configured to locate over a face of a user; and a filter window laterally offset from the transparent center region;

a filter assembly comprising:

a filter media; and a seal:

encircling a periphery of the filter media; and defining a center groove configured to, in a first configuration, mate with the filter window to:

locate a rim of the filter window within the center groove to transiently retain the filter assembly within the filter window;

seal against exterior edges of the rim of the filter window; and seal against interior edges, opposite the exterior edges, of the rim of the filter window; and defining an outer groove offset from the center groove and configured to, in a second configuration, mate with the filter window to:

locate the rim of the filter window within the outer groove to transiently retain the filter assembly within the filter window;

seal against the exterior edges of the rim of the filter window; and seal against the interior edges, opposite the exterior edges, of the rim of the filter window; and a gasket:

arranged on a rear face of the lens center section; and configured to:

seal against the face of the user to align the transparent center region with a nose and a mouth of the user; and locate the lens center section and the filter assembly offset from the face of the user to form an airflow channel extending across a left glabrous cheek region of the user.

18. The respirator apparatus of claim 17:

wherein the center groove:

defines a forked geometry extending about a periphery of the first seal and comprising:

a first tine;

a second tine opposite the first tine; and a slot interposed between the first tine and the second tine; and is configured to transiently couple the filter window to:

locate a rim of the filter window within the slot of the forked geometry;

seal the first tine of the forked geometry against exterior edges of the rim of the filter window; and seal the second tine of the forked geometry against interior edges, opposite the exterior edges, of the rim of the filter window.

* * * * *